United States Patent [19]
Kodet et al.

[11] Patent Number: 5,526,260
[45] Date of Patent: Jun. 11, 1996

[54] DEVICE EXECUTING INTERVISIBILITY CALCULATION

[75] Inventors: Thomas A. Kodet, Albuquerque; Marie A. Stoffer, Rio Rancho; Douglas E. Thorpe, Albuquerque, all of N.M.

[73] Assignee: Honeywell Inc., Minneapolis, Minn.

[21] Appl. No.: 488,808

[22] Filed: Jun. 8, 1995

Related U.S. Application Data

[63] Continuation of Ser. No. 183,090, Jan. 18, 1994, abandoned.

[51] Int. Cl.$^6$ .................................................. G05D 1/00
[52] U.S. Cl. .................................. 364/423; 364/449
[58] Field of Search ........................... 364/423, 449, 364/454, 456, 521, 522; 340/709, 721, 727, 729, 734, 747; 342/64, 65; 434/38, 40, 43

[56] References Cited

U.S. PATENT DOCUMENTS

| | | | |
|---|---|---|---|
| 3,909,605 | 9/1975 | Rowe et al. | 235/152 |
| 4,760,396 | 7/1988 | Barney et al. | 342/65 |
| 4,855,937 | 8/1989 | Heartz | 364/521 |
| 4,882,590 | 11/1989 | Huss et al. | 342/453 |
| 4,884,220 | 11/1989 | Dawson et al. | 364/521 |
| 4,903,216 | 2/1990 | Huss et al. | 364/518 |
| 4,964,723 | 10/1990 | Murgue et al. | 356/141 |
| 4,985,854 | 1/1991 | Wittenburg | 364/522 |
| 5,086,396 | 2/1992 | Waruszewski, Jr. | 364/454 |
| 5,136,512 | 8/1992 | Le Borne | 364/461 |
| 5,179,638 | 1/1993 | Dawson et al. | 395/125 |
| 5,282,013 | 1/1994 | Gregoris | 356/4 |
| 5,309,522 | 5/1994 | Dye | 382/41 |

OTHER PUBLICATIONS

Proceedings of the SPIE—The Int'l Society for Optical Engineering, 1993, USA, vol. 1955, ISSN 0277-786-X, pp. 318–323, Real–Time Inter Visibility Calculations for Ground–Based Radar Systems, Libby, V. et al.

IBM Technical Disclosure Bulletin, vol. 34, No. 2, Jul. 1991, New York, US, pp. 61–66, Three–Dimensional Intervisibility Algorithm, Anonymous.

IBM Technical Disclosure Bulletin, vol. 37, No. 1, Jan. 1994, New York, US, pp. 649–652, Terrain Exposure Factor, Anonymous.

*Primary Examiner*—Kevin J. Teska
*Assistant Examiner*—Stephen J. Walder, Jr.
*Attorney, Agent, or Firm*—Kenneth J. Johnson; Keith A. Cushing

[57] ABSTRACT

A device executing intervisibility calculation includes a mechanism executing a radial spoke scan pattern where individual radials are traversed beginning at a threat installation and extending outward along a radial to a distance corresponding to threat range capability. Intervisibility calculation is simplified to allow implementation in a simple, dedicated hardware engine to provide rapid execution time while ensuring accurate intervisibility results. The intervisibility engine includes lookup tables to provide precalculated data and advantageously avoids divide operations whereby the intervisibility calculation may be executed by use of a series of adds, subtracts, and multiplies relative to intervisibility data developed while traversing a given radial. The engine calculates a slope for each data post visited in traversing a radial, and identifies a data post as being visible when its associated slope is greater than a previously encountered greatest magnitude slope. The engine stores in a digital terrain elevation database an intervisibility ground reference value representing a magnitude of vertical clearance between a given data post elevation and a threat detection envelope thereabove. The execution time provided by the intervisibility engine of the present invention is sufficiently fast to allow dynamic, in-flight calculation to aid in intervisibility calculation relative to a just discovered or just moved threat installation. The digital terrain elevation data may be referenced to display or select routes relative to known or detected threat installations.

4 Claims, 8 Drawing Sheets

DEVICE EXECUTING INTERVISIBILITY CALCULATION

GOVERNMENT RIGHTS

The Government has rights in this invention pursuant to Contract No. FBB600-88-G-5107, awarded by the Department of the Air Force.

This application is a continuation of application Ser. No. 08/183,090, filed on Jan. 18, 1994, now abandoned.

BACKGROUND OF THE INVENTION

The present invention relates generally to an apparatus for aircraft flight management, and particularly to an apparatus for intervisibility calculation with respect to digital terrain elevation data (DTED).

Digital terrain elevation data represents surface elevation at discrete "data posts." Each data post has a surface location or address, e.g., latitude and longitude, and an associated altitude, i.e., relative to sea level. Thus, a simple form of a DTED database would deliver a scaler altitude in response to longitude and latitude input. More complicated DTED databases have been developed for certain applications. For example, U.S. Pat. No. 4,899,292 issued Feb. 6, 1990 to J. F. Dawson and E. W. Ronish shows a tessellation method for creating a spherical database by warping a digital map, including digital terrain elevation data, by longitude and latitude parameters.

DTED database systems are used in flight mission computer systems and flight planning strategy in military applications to aid in, for example, covert and evasive flight operations. As used in mission computer systems, a DTED database can aid a pilot in time-critical maneuvers such as terrain following flight or in selecting evasive routes having low observability with respect to a given threat position. Such threat positions may be known in advance and included in the DTED database, or detected while in flight. The computation speed required in accessing and calculating routes or alternatives based on DTED systems can be vitally critical, especially for computations executed repeatedly to keep a pilot fully appraised of current terrain conditions and route alternatives. Thus, improvements in methods of accessing DTED and computations based on extracted DTED are not simply improvements in computational elegance, but can be life-saving and critical to mission success.

SUMMARY OF THE INVENTION

The apparatus of the present invention identifies terrain obscured by other terrain with respect to the view of a threat installation, including calculation of the extent of vertical clearance between a threat detection envelope and a given obscured ground point. Under the present invention, a series of radials are identified emanating from a given threat installation, and for each radial identified data points therealong are visited and an intervisibility calculation performed relative thereto. The intervisibility calculation of the present invention provides a zero value for all data points visited along the radial within view of the threat installation. A non-zero value is provided for each point visited when obscured by intervening terrain, the non-zero value representing a vertical clearance between the data point and the lower boundary of the threat detection envelope thereabove. Each data point visited along each radial, beginning at a data point nearest the threat installation, is associated with a slope value corresponding to the relative difference in altitude between the threat installation and the data post visited. As the data points are visited in traversing outward along a radial, a maximum previous slope calculated is maintained. For each point visited, the associated slope value is compared to the maintained maximum slope value. If the slope value associated with the current data point is greater than the maintained maximum slope value, then the current data post is considered visible with respect to the threat installation and its slope value is adopted as the maximum slope value. If, however, the slope value for a given data point visited is less than the maintained maximum slope value, then the data point visited is considered terrain masked relative to the threat installation. Furthermore, the maintained maximum slope value represents the threat detection envelope above the data point visited whereby the maintained maximum slope value in conjunction with the slope value associated with the terrain masked data point provides a basis for calculating the vertical separation between the obscured data point visited and the lower boundary of the threat detection envelope. In this manner, the vertical separation value may be stored along with the data point elevation data to indicate not only visibility but also a representation of the extent of terrain masked vertical clearance above the data point.

The subject matter of the present invention is particularly pointed out and distinctly claimed in the concluding portion of this specification. However, both the organization and operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF THE PREFERRED EMBODIMENT

The preferred embodiment of the present invention as illustrated in the drawings comprises an apparatus which performs an intervisibility calculation that identifies terrain obscured by other terrain with respect to the view of a threat installation. The method of the present invention further identifies the vertical separation between the obscured terrain and a threat installation detection envelope. As may be appreciated, such information can be then used to identify air space supporting a mission route within the range capability of the threat installation, yet obscured from view by the threat installation. This vertical separation or clearance between obscured terrain and a detection envelope thereabove is referred to herein as an "intervisibility ground reference" or IGR value.

The data intensive calculation of threat intervisibility in a real time aircraft environment demands a simple dedicated hardware implementation. To keep within strict cost and development schedule requirements, the complexity of the hardware must be held to a minimum. Hardware complexity can be minimized if the operational steps, or algorithm, to perform the task is highly repetitive, has a small number of unique operations to perform, and requires little or no local RAM memory to manage. The method of intervisibility calculation under the present invention exhibits these characteristics and is thereby advantageously implemented in such a simple, dedicated hardware device.

A threat intervisibility calculation indicates what terrain is surrounding a threat, e.g., anti-aircraft SAM sight, is hidden from the threat sensor equipment, typically a radar-type sensor. Terrain may be hidden from the threat sensor equipment because it is either out of range capability of the threat, or within range but terrain masked relative to the view of the threat installation. The intervisibility calculation allows the pilot to choose a flight path minimizing or avoiding aircraft exposure to threat detection. To properly calculate intervisibility, terrain surrounding the threat must be fully analyzed taking into account such factors as DTED database characteristics, radar range, threat elevation, earth curvature, and radar curvature along the earth's surface. As may be appreciated it is difficult to compensate for all these factors while maintaining reasonable calculation performance, i.e., speed and accuracy, in a simple, dedicated hardware implementation.

Intervisibility calculation in accordance with the present invention shall be illustrated in the context of a radial scan pattern method of accessing DTED database systems. Under a radial scan pattern, a point of interest is selected, e.g., a threat installation, and data sampling occurs along radials emanating from the point of interest and having a length corresponding to, for example, the range capability of the threat installation. While raster scan techniques can be employed to sample and analyze a DTED database, typically addressed in a two-dimensional or XY addressing scheme, radial scan pattern sampling requires less hardware, i.e., memory, and has proven a successful method of scanning and analyzing DTED database systems for intervisibility calculations.

Figure 1:
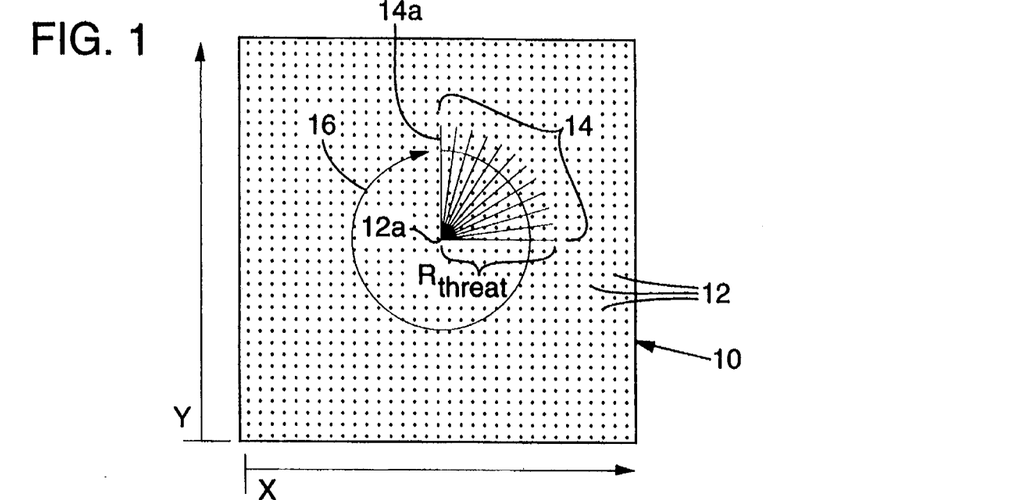
FIGS. 1–3 illustrate a radial spoke pattern method of and device for accessing digital terrain elevation data.
Figure 2:
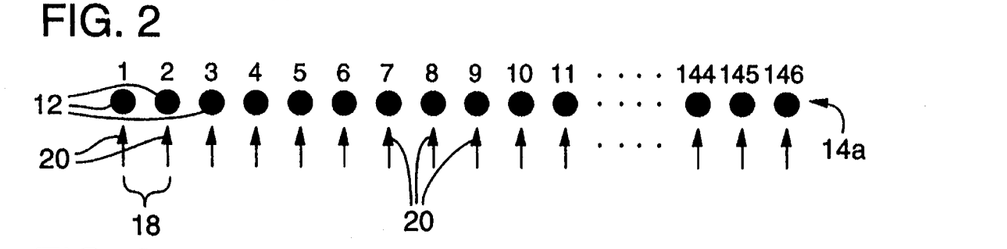
Figure 3:
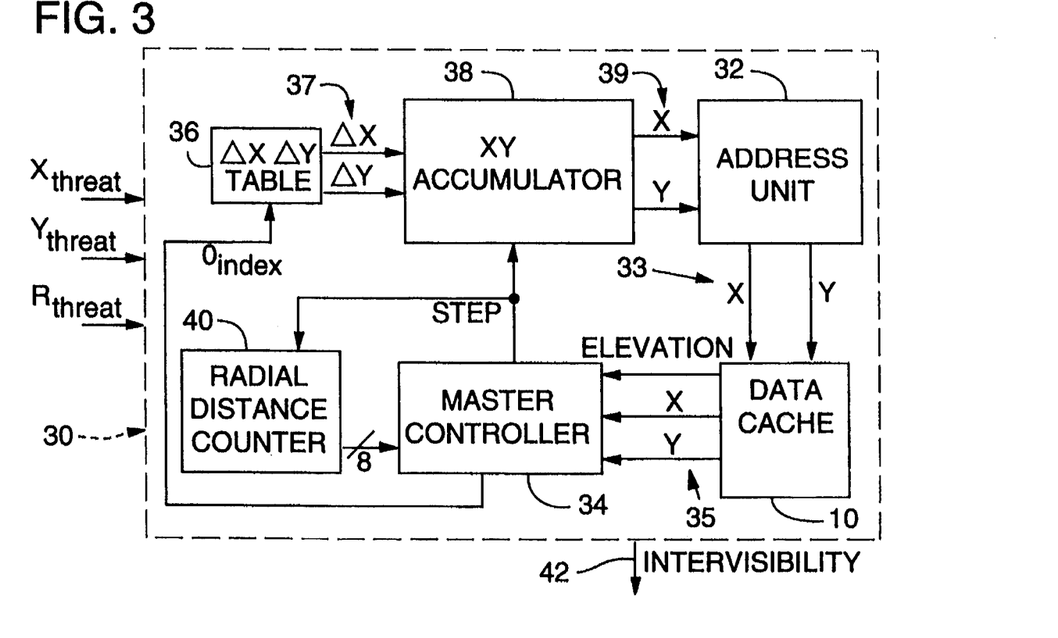

FIGS. 1–3 illustrate a hardware design and method for executing a radial scan pattern in sampling a DTED database during intervisibility calculation relative to a threat installation. In FIG. 1, a data cache 10 contains a relevant portion of a DTED database comprising a plurality of data posts 12 individually addressable according to a two dimensional, i.e., X and Y, addressing scheme. In execution of a radial scan intervisibility calculation, a threat installation is identified at the data post 12a with a given range capability indicated as $R_{threat}$. In the illustrated example, the distance $R_{threat}$ corresponds to 146 data posts 12. A radial scan is then executed by taking data samples along a set of radials 14 originating at the threat position 12a and extending a distance corresponding to $R_{threat}$, i.e., extending 146 posts from point 12a. A complete intervisibility calculation is thereby executed across a 360° scan 16. A partial intervisibility calculation may be executed by traversing only a portion of selected radials 14 emanating from data post 12a. Such a partial intervisibility calculation may include a contiguous sector of adjacent radials 14, or may comprise various sets of radial 14 sectors, i.e., various "pie slices" from the area surrounding data post 12a. The specific radials 14 traversed and the pattern of radials 14 traversed may, therefore, vary according to the type of intervisibility calculation required and execution time allowed. The following discussion will focus primarily upon calculations performed while traversing one radial 14.

In FIG. 2, a sample step 18 corresponds to the spacing between data posts 12 along, for example, vertical radial 14a, i.e., parallel to the Y axis as indicated in FIG. 1. The same number of steps 18 are taken along each radial 14 to sample out to a given distance $R_{threat}$. The method of traversing a constant radial 14 length as a function of a constant number of steps 18 allows, as will be apparent from the following discussion, a simple hardware mechanism for traversing radials 14 out to the distance $R_{threat}$. Thus, as each sample 20 is taken from the data cache 10, an intervisibility calculation may be performed relative to that sample. The angular increment between radials 14 is selected, taking into account the magnitude of sample step 18, to assure complete data post 12 visitation throughout the range capability of the threat at data post 12a.

The magnitude of sample step 18 is preferably equal to data post 14 spacing as discussed above, and the angular increment between radials is selected to insure that all data posts within the radius $R_{threat}$ are visited in the radial scan. Computer simulation has proven helpful in establishing the angular increment between radials 14 as a function of step 18 magnitude and $R_{threat}$ magnitude. While some data post 12 revisitation does occur under this method due to the density of radials 14 near the post 12a, it is considered better to have some data post 12 revisitation than to have a failure to visit all data posts 12 within the radius $R_{threat}$. Furthermore, some data posts 12 may be within the range capability of more than one threat installation, and it is desirable to always calculate an intervisibility result for each data post visited, regardless of a prior visitation of that data post, to insure that a most conservative intervisibility result is stored for each data post 12.

FIG. 3 illustrates in block diagram the hardware implementation of a radial scanner 30. Radial scanner 30 receives externally 3 values identifying a threat installation position, i.e., $X_{threat}$ and $Y_{threat}$, and the range capability of that installation, i.e., $R_{threat}$. Data cache 10 is accessed by way of address unit 32 providing X and Y address values 33 corresponding to the data posts 12 within cache 10. Data cache 10 in turn provides intervisibility input data 35, including X and Y location values and at least an elevation value for each data post 12 addressed by address unit 32. Intervisibility input data 35 may further include a prior intervisibility calculation (not shown in FIG. 3) for the data post currently visited and previously stored in cache 10. A master controller 34 thereby selects a most conservative intervisibility calculation by comparing a prior intervisibility result with a current intervisibility result. Thus, for a data post 12 lying within the range capability of more than one threat installation, the resulting intervisibility data stored in the DTED database 10 will provide a most conservative representation of intervisibility for that data post.

Master controller 34 selects a suitable angular increment between radials 14 to accomplish complete data post visitation as a function of the magnitude of the value $R_{threat}$. The 360° scan 16 is accomplished by sequentially sampling at increments of step 18 along the length of each of a plurality of radials 14 separated by this angular increment.

The angular orientation of each radial 14 traversed is applied in some fashion to a delta XY lookup table 36. Based on this angular orientation, lookup table 36 provides appropriate delta X and delta Y values 37 required to step or sample along the current radial 14 at increments of sample step 18. In the illustrated example, master controller 34 applies a control input $\theta_{index}$ to table 36 to determine the output of table 36. Thus, the control input $\theta_{index}$ could be a clock signal to increment a counter for addressing table 36, or could be an actual address value for accessing table 36. In any case, master controller 34 causes table 36 to output suitable delta X and delta Y values 37 corresponding to the angular orientation of the radial 14 currently being traversed. An XY accumulator 38 sums a series of delta X and a series of delta Y values received from table 36 for application as address values 39 to address unit 32. As may be appreciated, the values presented to and accumulated in XY accumulator 38 represent real number values whereas the values 39 provided to address unit 32 by XY accumulator 38 are truncated to provide suitable integer address values for application to data cache 10.

A radial distance counter 40 monitors the progress along each radial 14, i.e., counts the steps 18, and allows master controller 34 to detect when a scan along the full length, i.e., out to the distance $R_{threat}$, of a radial 14 is complete. After each radial 14 is scanned, a new $\theta_{index}$ is applied to the table 36, the counter 40 is reset, and scanning is executed along the next radial 14. After all radials 14 have been scanned in this manner, a complete intervisibility calculation 42 for the threat at post 12a is available. More particularly, and as will be discussed more fully hereafter, an intervisibility calculation is performed on a post-by-post basis whereby master controller 34 may write for each data post sampled appropriate intervisibility data back into data cache 10. This intervisibility data may be employed directly to drive a display relative to the threat installation analyzed, or may be simply retained in data cache 10 for other uses.

An intervisibility calculation is thereby executed at each data post 12 in the threat range $R_{threat}$ to identify all terrain masked regions within the threat range. The apparatus of the present invention provides an "intervisibility ground reference" or IGR value representing the vertical distance or clearance between a terrain masked data post and the threat detection envelope thereabove. This intervisibility ground reference value for each data post 12 can be stored on a one-to-one basis with the DTED database records and used, for example, in aircraft instrument display or in selecting a terrain following route masked with respect to specific threat installations. Each intervisibility ground reference value thereby relates two specific data posts 12, one post being a data post 12 sampled during the radial scan and associated or stored with the intervisibility ground reference value and the other post being the data post 12 associated with a threat installation, e.g., post 12a. In this manner, each data post 12 within the distance $R_{threat}$ of the data post 12a may be identified as being either visible or hidden from view relative to the threat.

The intervisibility calculation under the present invention provides a zero value intervisibility ground reference for all data posts 12 identified as being visible with respect to the threat installation. A non-zero intervisibility ground reference value (IGR) indicates terrain masking of the corresponding data post 12 relative to a threat installation. The magnitude of the non-zero IGR value represents a vertical distance between the given data post and the lower boundary of the threat detection envelope thereabove. The intervisibility ground reference value is independent of aircraft position and altitude and useful generally in selecting terrain-masked routes within a threat installation range capability. The intervisibility of terrain surrounding a given threat installation need only be calculated once when the threat is first identified, and also when its position or elevation has changed. These properties of intervisibility calculation under the present invention greatly reduce the throughput requirements of the intervisibility calculation because most threats are stationary during the time-frame of a given mission.

Figure 4:
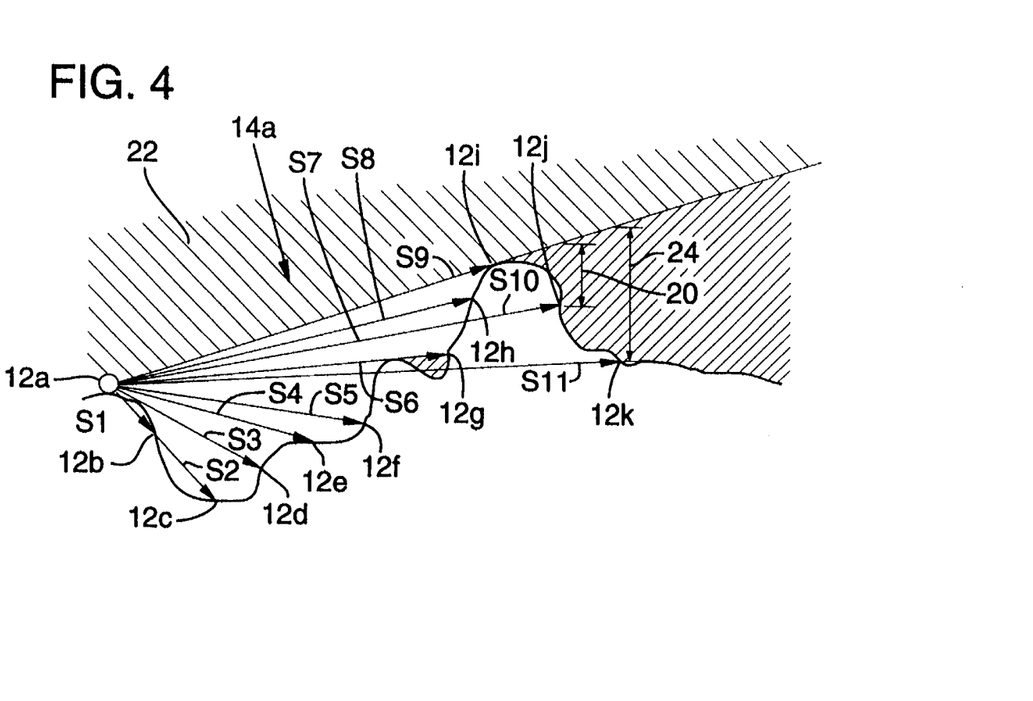
FIG. 4 illustrates a sectional terrain view showing calculation of intervisibility based on a line slope comparison method of calculation for an intervisibility ground reference value in accordance with the present invention.

FIG. 4 illustrates sampling along one of the radials 14 and calculation of an intervisibility ground reference value for only the first eleven data posts 12 visited along the radial 14, it being understood that an intervisibility calculation is executed for all data posts 12 visited along each radial 14 traversed. FIG. 4 is a terrain elevation cross-section profile taken through the data post 12a and along the radial 14a showing relative elevation among the data posts 12 along a given radial 14 and the threat installation at the data post 12a. The radial scan pattern method of accessing the cache 10 selects data posts 12b–12k as the first 11 data posts 12 lying on the given radial 14. Each of the data posts 12 lying along the radial 14 are associated with a slope value relative to the threat 12a. These slope values are indicated graphically in FIG. 4 as the lines or slopes S1–S11 emanating from the post 12a and extending to the elevation of each of the data posts 12b–12k, respectively.

Each new slope, designated $S_{new}$, calculated while working out from the threat position, is compared to a prior greatest magnitude reference slope, designated $S_{ref}$. If $S_{new}$ is greater than or equal to $S_{ref}$, then the terrain at the data post associated with $S_{ref}$ is considered "visible" to the threat sensor. For this visible case, the $S_{ref}$ value is replaced with the current $S_{new}$ value and an intervisibility ground reference value for that post is set to zero. If $S_{new}$ is less than $S_{ref}$ then the data post is considered "hidden" from sensor view. When beginning traversal of a new radial 14, the $S_{ref}$ variable is set to a maximum negative value. Thus, the first data post encountered along a radial is deemed "visible" to the threat and provides the first reference slope $S_{ref}$ for subsequent data samples 20 taken.

The data posts 12b–12i all receive a zero magnitude intervisibility ground reference values because an unobscured line of sight exists between each of data posts 12b–12i and the threat installation at data post 12a. Data posts 12j and 12k, however, are terrain masked with respect to the threat installation at data post 12a. Accordingly, data posts 12j and 12k will receive non-zero intervisibility ground reference values. For data post 12j, the intervisibility ground reference value 20 corresponds to the distance between the data post 12j and the threat detection envelope 22. For data post 12k, the intervisibility ground reference value 24 corresponds to the distance between data post 12k and the detection envelope 22.

Once an intervisibility ground reference value is calculated, it is stored in the DTED database 10. This is easily accomplished by making the DTED database memory deep enough to store the associated intervisibility ground reference value with the DTED data post elevation data. By definition, if a DTED data post is hidden from a sensor and is within range of the sensor, its associated intervisibility ground reference value will be non-zero. If the post is visible to the sensor, then the intervisibility ground reference value will be zero. Note that for each DTED data post 12 visited, a read-modify-write operation is performed on the DTED database memory. In the case of terrain in the detection range of several threats, the algorithm of the present invention compares the intervisibility ground reference value already stored for a given data post 12, i.e., as derived in previous intervisibility calculations with respect to other threats, with the newly calculated intervisibility ground reference value from the threat currently under consideration. If the previous intervisibility ground reference value is less than the current intervisibility ground reference value, then the previous intervisibility ground reference value is maintained in memory. If the new intervisibility ground reference value is less than the previous intervisibility ground reference value, then the new intervisibility ground reference value is written into memory, destroying the previous value. This assures the most conservative and safest intervisibility calculation at any particular data post 12.

FIGS. 5A–5I illustrate successive intervisibility calculations by slope comparison at the first through tenth, respectively, data posts 12 encountered while traversing a given radial 14. A terrain profile 32 is shown in FIGS. 5A–5I as a collection of data posts 12 lying along radial 14. The horizontal axis of each of FIGS. 5A–5I corresponds to the distance of the corresponding data post 12 relative to the threat 30 in step 18 units. More particularly, the horizontal axis represents the distance from the threat 30 expressed in increments of data post 12 spacing, i.e., the content of radial distance counter 40 (FIG. 3). The vertical axis of FIGS. 5A–5I corresponds to elevation in meters.

Figure 5A:
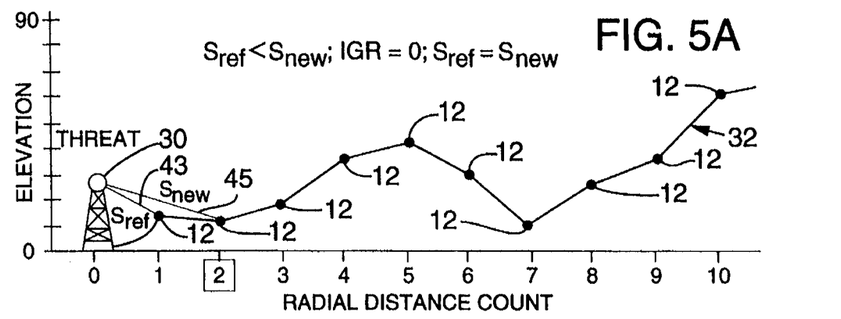
FIGS. 5A–5I illustrate computation of intervisibility ground reference values along a first portion of a radial during a radial pattern scan.
Figure 5B:
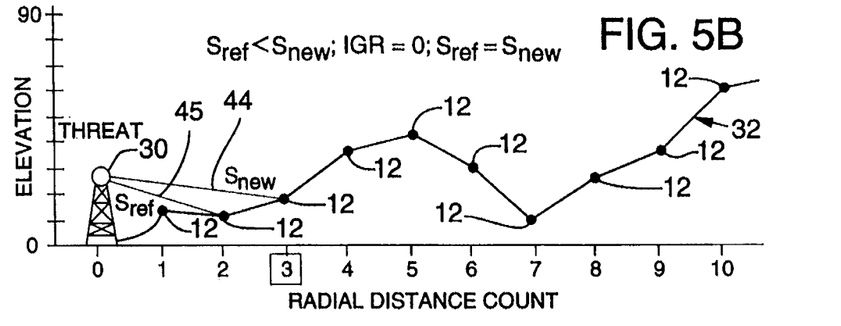

FIG. 5A shows intervisibility calculation at the second data post 12 encountered along a radial 14. The first data post 12 encountered establishes slope 43 as a first reference slope $S_{ref}$. Thus, at this time slope $S_{ref}$ corresponds to the slope 43, a line connecting threat 30 and the first data post 12. The slope 45 is taken as the current slope $S_{new}$ and corresponds to the slope between threat 30 and the second data post 12 encountered. Because $S_{new}$ (slope 45) is greater than $S_{ref}$ (slope 43), $S_{new}$ will be taken as the new reference slope $S_{ref}$. In FIG. 5B, intervisibility calculation at the third data post 12 takes slope 45 as the reference slope $S_{ref}$ and slope 44 as slope $S_{new}$. Because slope 44 exceeds slope 45, slope 44 becomes the reference slope $S_{ref}$.

Figure 5C:
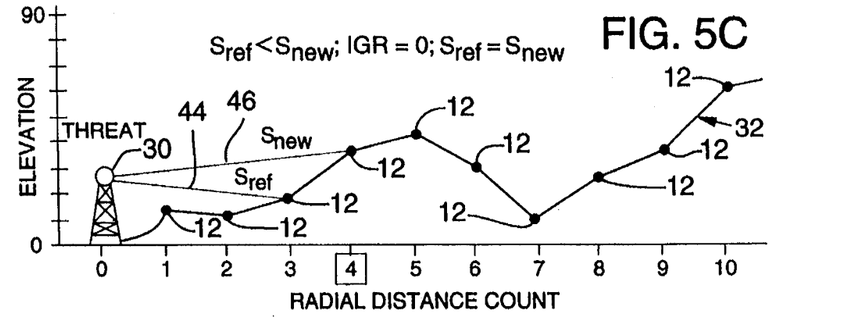
Figure 5D:
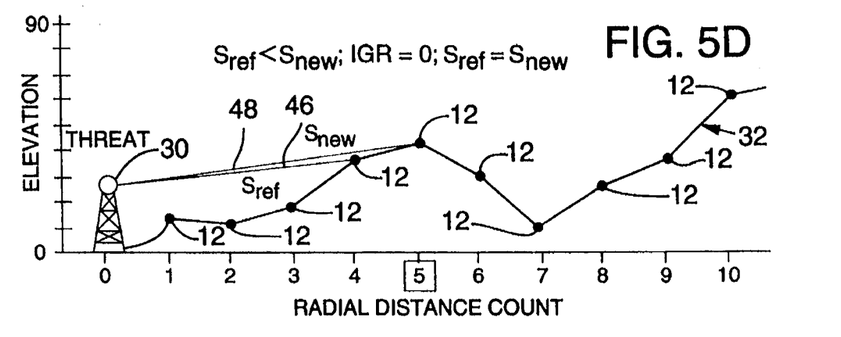

FIG. 5C shows intervisibility calculation at the fourth data post 12 encountered along the radial 14. Previously, the slope 44, being the greatest magnitude slope encountered thus far, was identified as the reference slope $S_{ref}$. Slope 46, associated with the fourth data post, is taken as the current slope $S_{new}$. Because slope 46 is greater than slope 44, i.e., slope $S_{new}$ greater than slope $S_{ref}$, the forth data post is taken as being visible with respect to threat 30. In FIG. 5D, slope 48 associated with the fifth data post assumes the status of slope $S_{new}$ and is greater than the previous slope $S_{ref}$, i.e., slope 46, and the fifth data post is taken as being visible with respect to threat 30. Also, slope 48 is now taken as the reference slope $S_{ref}$.

Figure 5E:
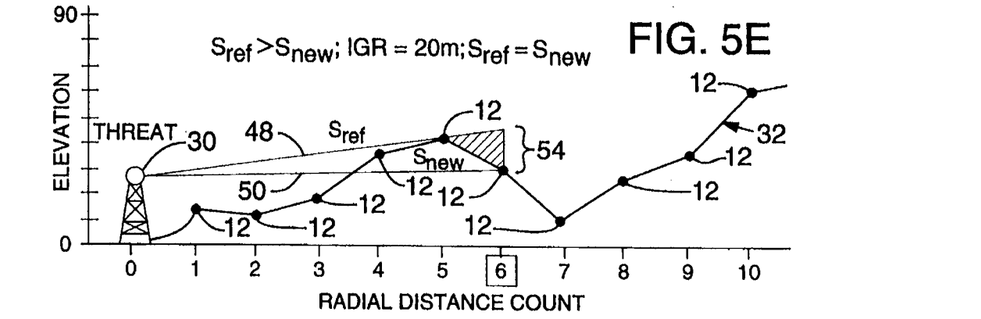

FIG. 5E shows analysis at the sixth data post 12 encountered where the slope 50, currently slope $S_{new}$, is less than the previously identified slope 48, currently slope $S_{ref}$. The sixth data post encountered, therefore, is considered terrain masked with respect to the detection envelope of threat 30. Also, an intervisibility ground reference value 54 may be computed for the sixth data post 12 as a representation of the vertical spacing between the sixth data post 12 and the detection envelope of the threat 30 thereabove.

Figure 5F:
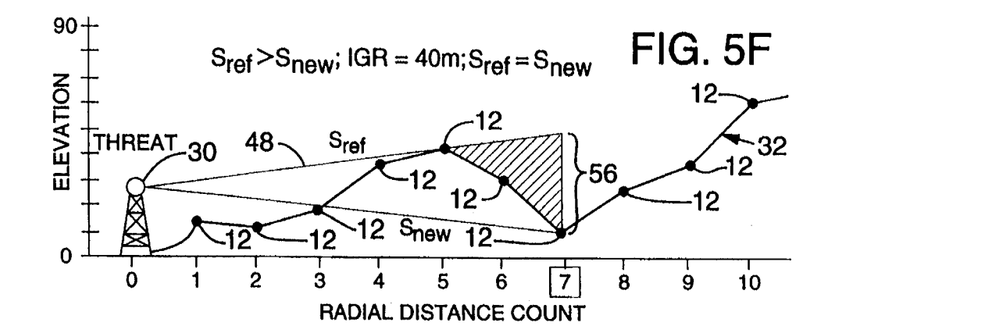
Figure 5G:
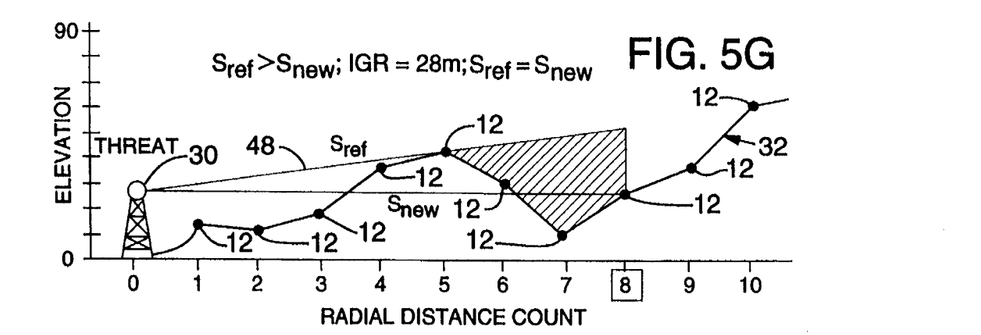
Figure 5H:
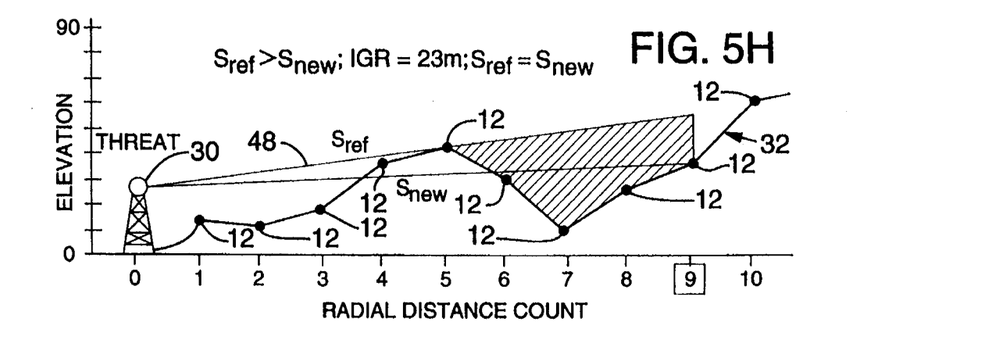
Figure 5I:
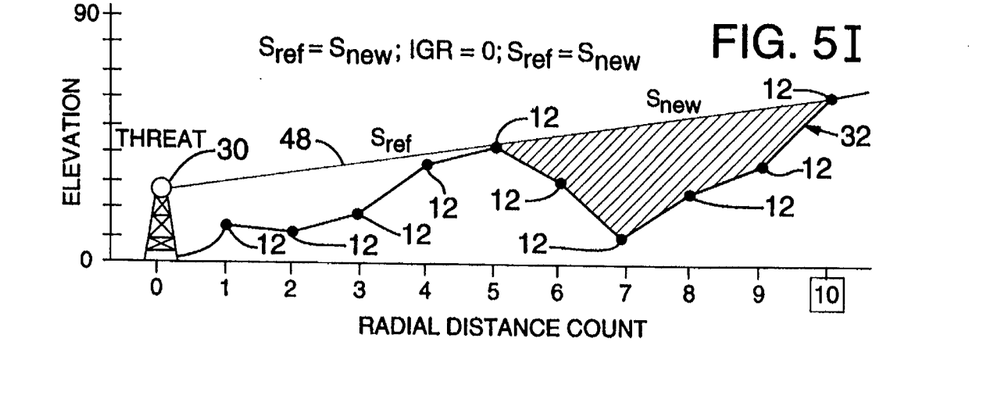

Turning to FIG. 5F, an intervisibility ground reference value 56 is calculated for the seventh data post 12. Note, the slope 48 remains as the reference slope $S_{ref}$, i.e., the greatest magnitude slope encountered thus far, and therefore as a representation of the lower boundary for the detection envelope of threat 30. FIGS. 5G–5H illustrate further steps at the eighth and ninth data posts 12 encountered. Each of the eighth and ninth data posts are associated with slopes less than slope 48, i.e., less than reference slope $S_{ref}$, and is considered terrain masked with respect to the threat 30. As shown in FIG. 5I, the tenth data post 12 encountered is associated with a slope equal to the current reference slope $S_{ref}$, and is therefore taken as being visible with respect to threat 30.

The combined intervisibility ground reference values associated with the sixth through tenth data posts encountered indicate a vertical plane through which an aircraft may fly undetected by the threat 30, yet be within its range capabilities. Taken with other intervisibility ground reference values obtained for data posts 12 along other radials 14, a volume of terrain masked space surrounding threat 30 and within the range capability of threat 30 may be identified.

Figure 6:
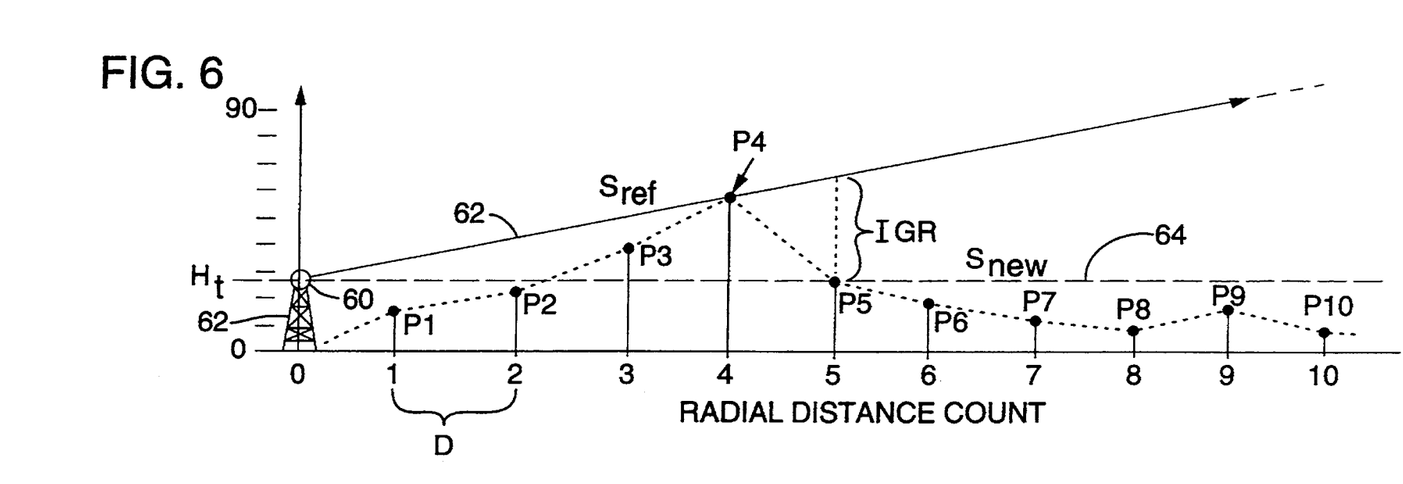
FIG. 6 illustrates in greater detail intervisibility calculation at a specific data post during radial traversal.

FIG. 6 illustrates calculation of a particular intervisibility ground reference value taking into account threat elevation, i.e., tower elevation. In FIG. 6, a threat 60 is positioned on a tower 62 having a height $H_t$. Intervisibility is shown as calculated for the fifth data post 12 encountered, with the slope 62 representing $S_{ref}$, i.e., the lower boundary of the threat detection envelope. The slope $S_{ref}$ is computed generally as follows:

$$S_{ref} = \frac{H_{ref} - H_t}{\text{Count}_{ref} \cdot D} \quad (1)$$

where $H_{ref}$ represents elevation for the data post 12 establishing the reference slope, $H_t$ represents tower 62 height, $\text{Count}_{ref}$ represents a distance from the threat 60 to the data post 12 establishing the reference slope expressed as a multiple of whole increments D, and D represents data post 12 spacing. In the example of FIG. 6, reference slope $S_{ref}$ is the slope 62 established by the fourth data post 12 and calculated as follows:

$$S_{ref} = \frac{H_4 - H_t}{4 \cdot D} \quad (2)$$

where $H_4$ is the height of the fourth data post 12 encountered and the post 12 spacing increment D is multiplied by the integer 4 because the reference slope $S_{ref}$ corresponds to the slope associated with the fourth data post 12.

The general equation for calculation of the slope $S_{new}$ is as follows:

$$S_{new} = \frac{H_{new} - H_t}{\text{Count}_{new} \cdot D} \quad (3)$$

where $H_{new}$ corresponds to the height of the data post 12 presently under intervisibility calculation and the value $\text{Count}_{new}$ corresponds to the count value associated with the data post 12 currently under intervisibility calculation.

The slope $S_{new}$ for slope 64 is calculated in the example of FIG. 6 as follows:

$$S_{new} = \frac{H_5 - H_t}{5 \cdot D} \quad (4)$$

where $H_5$ is the elevation associated with the fifth data post under intervisibility calculation and the denominator is calculated by multiplying the data post 12 spacing D by the integer 5.

Intervisibility calculation under the present invention advantageously allows slope comparison and calculation of an intervisibility ground reference value without reference to the actual data post 12 spacing factor D. Multiplying each of the above general equations 1 and 3 for the slopes $S_{ref}$ and $S_{new}$, respectively, by the data post 12 spacing factor D provides the following relationship discussed more fully hereafter:

$$D \cdot S_{ref} = \frac{\text{Count}_{ref} - H_t}{\text{Count}_{ref}} \quad (5)$$

$$D \cdot S_{new} = \frac{\text{Count}_{new} - H_t}{\text{Count}_{new}}$$

A compare operation must be performed for each slope $S_{new}$ calculated to identify terrain masked with respect to the threat installation. The following compare operation returns a false result for terrain masked with respect to the threat under consideration:

$$S_{ref} \leq S_{new} \quad (6)$$

From the above general equations 1 and 3 for slopes $S_{ref}$ and $S_{new}$, respectively, the following substitution results:

$$\frac{\text{Count}_{ref} - H_t}{\text{Count}_{ref} \cdot D} \leq \frac{\text{Count}_{new} - H_t}{\text{Count}_{new} \cdot D}$$

Because the data post 12 spacing D is always positive, each side of the inequality may be multiplied by the post spacing factor D to derive the following:

$$\frac{\text{Count}_{ref} - H_t}{\text{Count}_{ref}} \leq \frac{\text{Count}_{new} - H_t}{\text{Count}_{new}} \quad (7)$$

The initial compare operation performed for each data post 12 visited along a given radial 14, i.e., is then a function of equation 6 above. Those data posts 12 identified as being terrain masked with respect to the threat under consideration are then associated with a non-zero intervisibility ground reference value as calculated under the following equation:

$$IGR_{new} = [S_{ref}(\text{Count}_{new} \cdot D)] - [S_{new}(\text{Count}_{new} \cdot D)] \quad (8)$$

where $IGR_{new}$ is the intervisibility ground reference value computed for the data post 12 under consideration. Equation 8 is further simplified as follows:

$$= [S_{ref} - S_{new}] \cdot \text{Count}_{new} \cdot D$$

$$= (D \cdot S_{ref}) - (D \cdot S_{new}) \, \text{Count}_{new} \quad (9)$$

The terms $(D \cdot S_{ref})$ and $(D \cdot S_{new})$ can be substituted from the above derived equation 5 as follows:

$$IGR_{new} = \frac{\text{Count}_{ref} - H_t}{\text{Count}_{ref}} - \frac{\text{Count}_{new} - H_t}{\text{Count}_{new}} \cdot \text{Count}_{new} \quad (10)$$

Thus, the slope comparison required to identify terrain masked data posts as well as the calculation of an intervisibility ground reference value for a terrain masked data post 12 may be performed simply and efficiently, i.e., without reference to the data post 12 spacing factor D.

Thus, when the post 12 spacing factor D can be taken as a constant, it need not be used in the slope comparison or in calculation of the intervisibility ground reference value. This simplifies the hardware implementation by allowing the counter 40 (FIG. 3) to represent radial distance. The counter 40 stores a single scaler value reflecting the sample point position along the radial, where value zero equals the threat position and value 255, in the illustrated example, equals the maximum number of posts along a radial. Thus, the value held in the radial distance counter 40 is not a true measure of distance, but can be used advantageously as a distance value in calculation under the present invention. If the post spacing is 633 meters, for example, then an eight bit counter will allow a radial length of 633 meters times 256 or 152,048 meters (approximately 100 miles). This represents the maximum radar range capability supported in use of such a radial distance counter, and is sufficient for the majority of threat installations encountered. As may be appreciated, a larger counter would expand range capability support.

The intervisibility ground reference calculation as described thus far does not require any local RAM memory. A single register is required to hold the $S_{ref}$ data value from one post to the next. Therefore, the hardware implementation can forego any local static RAM and the circuitry required to manage it.

An accurate intervisibility calculation must include earth curvature and also radar beam refraction according to altitude dependent atmospheric density changes causing the radar beam to curve downward toward the earth as it moves away from the transmitter or the return source. Both of these factors become more pronounced as a function of distance.

Figure 7:
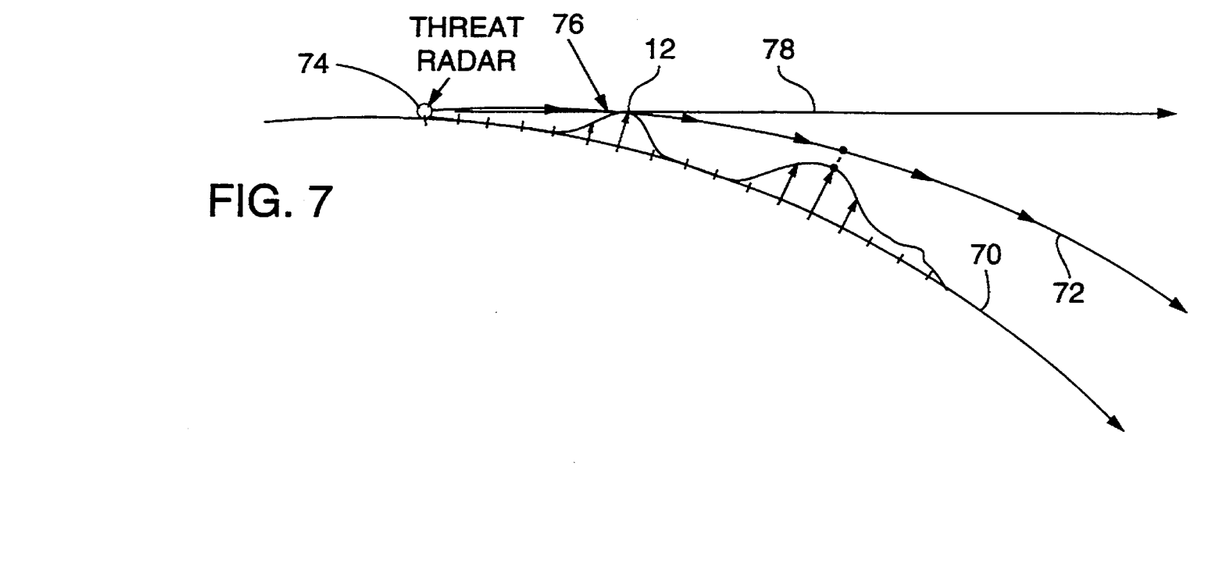
FIG. 7 illustrates earth curvature and radar curvature compensation for intervisibility calculations as a function of a distance representation provided under the present invention.

FIG. 7 illustrates earth curvature $E_c$ 70 and radar beam curvature $B_c$ 72 with respect to a threat installation 74 and a terrain profile 76. Terrain profile 76 includes a data post 12 establishing a line of sight threat detection envelope 78. When the DTED database is a flat earth model, earth curvature can be approximated by subtracting the difference between the line of sight ray 78 and the earth's surface, i.e., data post elevation, from the DTED post elevation. Radar curvature can be approximated by adding the difference between the earth's curvature 70 and the radar beam curvature 72. Therefore, the elevation normally associated with each data post 12 under consideration can be modified relative to a given threat position to compensate for earth curvature and radar beam curvature. The following equation modifies data post 12 elevation including compensation for earth curvature $E_c$ 70 and radar beam curvature $B_c$ 72:

$$DTED_{cc} = (DTED_R - E_{CR}) + (B_{CR} - E_{CR})$$

$$= DTED_R - (2E_{CR} + B_{CR}) \quad (11)$$

where the term $DTED_{cc}$ is curvature compensated data post 12 elevation, the term $DTED_R$ is the data post 12 elevation normally stored in the data cache 10, the term $E_{CR}$ represents an offset for earth curvature, and the term $B_{CR}$ represents an offset for radar beam curvature. The curvature compensation calculation can provide an earth and radar beam offset from the normal post height or elevation advantageously as a function of only the current radial distance counter value.

Figure 8:
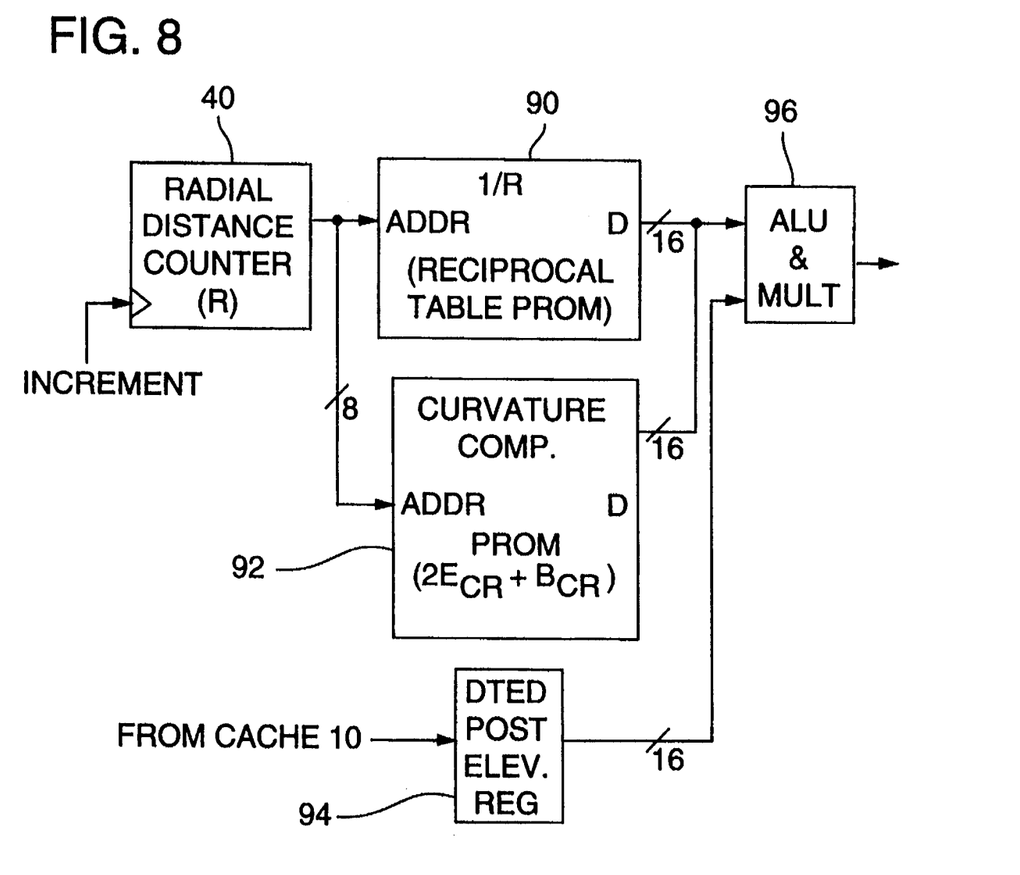
FIG. 8 illustrates a hardware implementation of the earth curvature and radar curvature compensation method illustrated in FIG. 7.

FIG. 8 illustrates a simple hardware scheme implementing the earth curvature and beam curvature compensation as a function of the radial distance counter 40, i.e., number of steps taken along a radial. The curvature compensation can be precalculated as a function of distance in increments of steps 18 out from the threat position. This data, i.e., the term $(2E_{CR} + B_{CR})$, is then stored in a PROM 92 addressed by the radial distance counter 40. As data samples are taken along a radial, the curvature compensation data, unique for and a function of each radial count value, is subtracted by ALU and multiplier 96 from the DTED data post elevation stored in register 94. The result is the above term $DTED_{CC}$, used thereafter as data post 12 height when comparing line slopes and computing an intervisibility ground reference values as discussed above., This warps the line of sight or detection envelope boundary 78 into appropriate compensation curvature. It has been determined that this method of approximation works well for radial distances up to 100 nautical miles from the threat position. Also shown in FIG. 8, a reciprocal table 90, addressed by counter 40, delivers the inverse of the radial count value to ALU 96 to avoid a division operation when performing slope comparison, such as in equation 7 above, and intervisibility ground reference value calculation, such as in equation 10 above.

Figure 9:
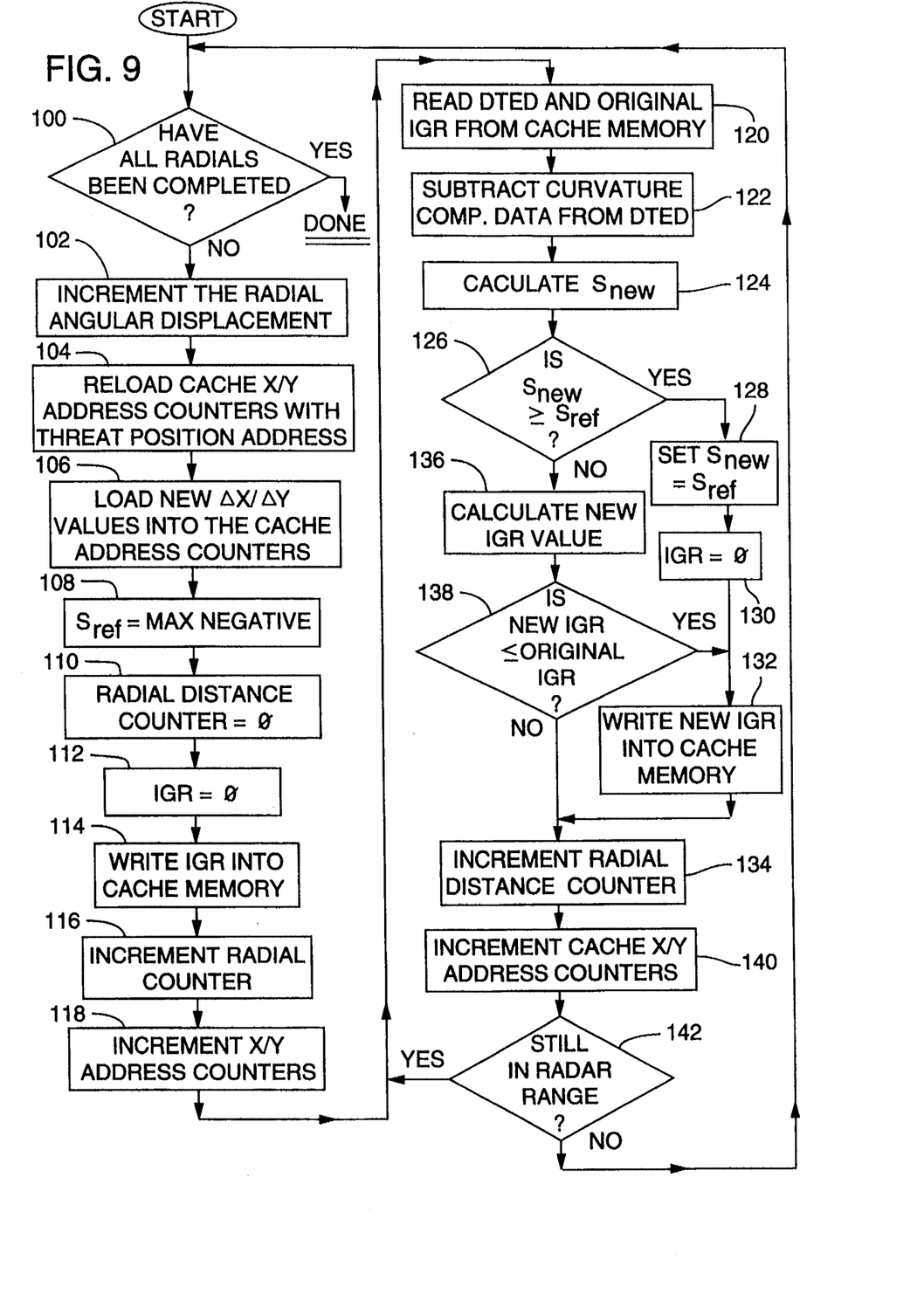
FIG. 9 is a flow chart illustrating a radial pattern intervisibility calculation according to the present invention.

FIG. 9 illustrates the general algorithm for executing an intervisibility calculation using a radial scanning pattern as described herein. In FIG. 9, processing beings at decision block 100 where the total number of radials traversed is compared to a total number expected to be traversed. If all the radials have been traversed processing completes by exiting through the YES branch of decision block 100. Otherwise, processing continues to block 102 wherein the next radial 14 is specified by modifying the angular displacement indication applied to the lookup table 36 (FIG. 3), i.e., $\theta_{index}$. In response, table 36 presents suitable delta X and delta Y values 37 for presentation to XY accumulator 38. In block 104, the master controller 34 resets the XY accumulator 38 to correspond to the threat position address $X_{threat}$ and $Y_{threat}$. Continuing to block 106, the master controller 34 asserts the step signal causing accumulator 38 to receive the delta X and delta Y values from lookup table 36 and provide appropriate XY address values 39 to address unit 32.

In block 108 master controller 34 sets the variable $S_{ref}$ to a maximum negative value as an initial reference value. In block 110 the radial distance counter 40 is reset to zero, and in block 112 the variable IGR (intervisibility ground reference) is set to zero. In block 114 the variable IGR is then written into data cache 10 as specified by the current X and Y address values for the threat position under consideration. The radial distance counter 40 is then incremented in block 116 to move to the first data post 12 along the designated radial 14 and also, in block 118, suitably increment the X and Y address values 39 presented to address unit 32. Continuing to block 120, master controller 34 then reads data 35 from data cache 10 to obtain the existing IGR value from data cache 10 in addition to the associated elevation data.

In block 122, the earth curvature and radar curvature compensation data are utilized to offset the elevation data obtained from data cache 10 for the currently addressed data post 12. Given this curvature compensated data post elevation data, the variable $S_{new}$ is then calculated in block 124. In decision block 126, the variable $S_{new}$ is compared to the variable $S_{ref}$. If $S_{new}$ is greater than or equal to $S_{ref}$, then processing branches to block 128 where the value of the variable $S_{new}$ is assigned to the variable $S_{ref}$. In block 130, the variable IGR is set to zero to indicate that the data post 12 presently under consideration is visible to the threat installation under consideration. In block 132, this IGR value is written into data cache 10 and processing continues to block 134.

Returning to decision block 126, if the variable $S_{new}$ is not greater than or equal to the variable $S_{ref}$, processing branches to block 136 where a non-zero IGR value is computed for the data post under consideration, i.e., for a data post considered terrain masked with respect to the threat installation under consideration. In decision block 138, the newly calculated IGR value is compared to the original IGR value for the data post under consideration. If the new IGR value is less than or equal to the original IGR value then processing branches to block 132 where the new IGR value is written into cache 10 to reflect the most conservative IGR to be associated with the data post 12 under calculation. If, however, the new IGR is not less than or equal to the original IGR, then there is no need to modify the existing IGR value in data cache 10 and processing branches directly to block 134.

In block 134, the radial distance counter 40 is again incremented to address the next data post 12 on the radial 14 currently being traversed. As a result, and as indicated in block 140, the XY address values applied to address unit 32 are incremented to move to the next data post 12 under intervisibility calculation. In decision block 142, master controller 34 determines whether or not the current radial 14 has been fully traversed, i.e., examines the value currently held in radial distance counter 40, as an indication of being still within the radar range of the threat under consideration. If the data post currently under consideration is within the radar range of the threat installation under consideration, then processing branches through the YES path from block 142 back to block 120 and continues therefrom. If, however, the current radial has been fully traversed, then processing branches through the NO branch of the decision block 142 and returns to the decision block 100 and processing continues therefrom.

Figure 10:
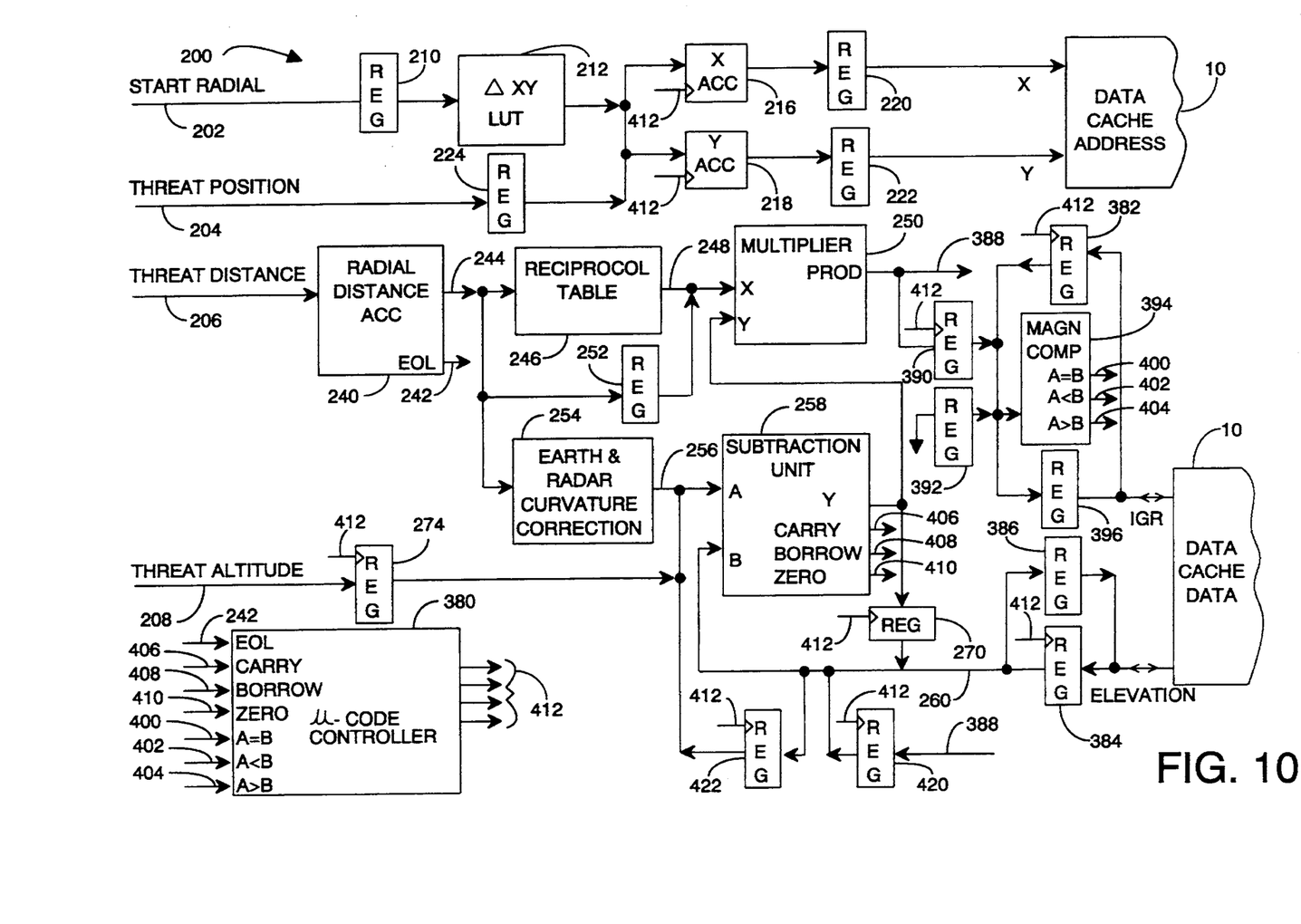
FIG. 10 illustrates in more detail a device executing intervisibility calculation in accordance with the present invention.

FIG. 10 illustrates in more detail a hardware engine executing intervisibility calculations as described herein. The engine of FIG. 10 accepts several input parameters and executes intervisibility calculation, including direct modification of the DTED data cache 10, for a given portion of a 360 degree radial scan. The engine of FIG. 10 receives the parameter values as external inputs, i.e., from a separate process control apparatus (not shown). Thus, each intervisibility calculation cycle accepts a starting angle indicating the first radial 14 to be traversed, a radial distance value expressed as a multiple of steps 18 and corresponding to threat range capability, a height of threat value, and a position of threat value expressed as XY coordinates of the data cache 10.

Once these external values are loaded, the engine of FIG. 10 executes intervisibility calculations for a given number of radials 14 and modifies the data cache 10 accordingly, i.e., modifies if necessary intervisibility ground reference values of the data cache 10 as described herein above. Data cache 10 is referenced by other in flight apparatus, such as display apparatus or flight planning apparatus, requiring intervisibility solutions relative to known or discovered threat or observation points.

In FIG. 10, intervisibility engine 200 receives as external parameters a start radial input 202, a threat position input 204, a threat distance input 206, and a threat altitude input 208. The start radial input 202 represents a selected one of radials 14 first traversed in the current intervisibility calculation cycle. As may be appreciated, intervisibility may be calculated against a selected number of radials 14 to accomplish a full 360 degree scan or a selected portion of a 360 degree scan. In the illustrated embodiment of the present invention, however, each intervisibility calculation cycle begins at the radial 14 indicated by start radial input 202 and continues through a fixed number of radials 14, i.e., covers a selected fixed-size segment of a 360 degree scan.

The start radial input 202 is applied to and stored within a radial register 210. Radial register 210 thereby applies an index or address value to a delta XY lookup table 212. As described herein above, the lookup table 212 provides appropriate delta X and delta Y values for stepping along the selected radial 14, i.e., as a function of the angular orientation of the radial 14 indicated in register 210. As may be appreciated, the delta X and delta Y values provided by lookup table 212, represent real number values, e.g., high precision scaled integers, and are applied to the X address accumulator 216 and Y address accumulator 218. Address accumulators 216 and 218 provide in turn address values for storage in address registers 220 and 222, respectively. The address values stored in registers 220 and 222 represent actual address values relative to data cache 10, i.e., X and Y address values specifying a given data post 12 along the selected radial 14.

Threat position input 204 is accepted and stored in a threat register 224. When beginning traversal of a given radial 14, the X and Y values representing the current threat position and stored in register 224 are loaded into accumulators 216 and 218 to begin traversal at a point 12 adjacent to the threat position. As the process proceeds, delta X and delta Y values taken from lookup table 212 are applied to accumulators 216 and 218 to successively address data posts 12 of cache 10 along the selected radial 14. When a given radial 14 has been fully traversed, threat position data stored in threat register 224 is again loaded into accumulators 216 and 218 to prepare for the next traversal, i.e. address a data post 12 adjacent the threat position. Also, when a new radial is selected for traversal, the value held in radial register 210 is modified to reflect the angular orientation of the next radial 14. In the preferred embodiment, register 210 can be a counter whereby successive entries in the table 212 correspond to successive radials to be traversed and register 210 may be incremented to address data for the next radial 14. In any case, the function of register 210 and lookup table 212 is to provide appropriate delta X and delta Y values to traverse a given radial 14 at steps corresponding to data post 12 spacing.

The threat distance input 206 is initially loaded into radial distance accumulator 240. Radial distance accumulator 240 performs the dual functions of counting steps taken along a given radial 14 and providing an indication of when a radial 14 has been completely traversed. Radial distance accumulator 240 provides an end of line (EOL) condition 242 to indicate completion of a given radial 14 traversal. For each intervisibility calculation performed at each data post 12 along a radial 14, radial distance accumulator 240 increments its counter (not shown). When the radial distance accumulator counter 240 detects the number of samples or steps taken along the current radial 14 as being equal to the threat distance input 206, radial distance accumulator 240 asserts the EOL condition 242. Otherwise, radial distance accumulator 240 provides a step count 244 representing, in terms of data post 12 spacing or sample step spacing, the distance of the data post 12 currently under intervisibility calculation from the threat installation position.

A reciprocal table 246 receives the step count 244 from radial distance accumulator 240 and provides as its output a step count reciprocal 248 made available to a first input of a multiplier 250. Step count 244 is also applied to a step register 252 making also available the step count 244 to the first input of multiplier 250. Finally, the step count 244 is applied as an index to an earth and radar correction lookup table 254. A curvature corrected output 256, provided as a function of the step count 244, is made available to a first input of subtraction unit 258. The second input of subtraction unit 258 has available a data post 12 elevation input 260 originating from the data cache 10. As may be appreciated, the data post 12 elevation as represented in data cache 10 may be then modified, i.e., by subtraction unit 258, to account for earth and radar curvature as discussed herein above. The output of subtraction unit 258 is applied to a second input of multiplier 250, and also applied to an intermediate register 270. Intermediate register 270 holds values during successive operations by subtraction unit 258, i.e. holds an output of subtraction unit 258 taken from one subtraction operation to be applied to the second input of subtraction unit 254 in a subsequent subtraction operation.

Threat altitude input 208 is accepted and stored in a threat altitude register 274. The content of threat altitude register 274 is made available to the first input of subtraction unit 258.

In the implementation illustrated in FIG. 10 data cache 10 stores for each data post 12 a current IGR value and a post elevation value for each XY address within cache 10. In the particular form of memory employed for cache 10, an entire entry must be rewritten to update a single field, e.g., not possible to write a value directly into only the IGR field of a given XY address entry. Engine 200 retrieves a given cache 10 entry, i.e., an IGR value and an elevation value as specified by the X and Y address values originating from registers 220 and 222. Engine 200 accepts the current IGR value taken from cache 10 in an IGR register 382. This makes available the current IGR value for comparison to a newly calculated IGR value and also permits rewriting of the retrieved IGR value, i.e., as stored in register 382, back into data cache 10 should the newly calculated IGR value be greater than the IGR value already stored in data cache 10. Similarly, the post elevation datum obtained from data cache 10 for each access thereto is first accepted in an elevation register 384 and then copied into a rewrite register 386. In this manner, the elevation data may be written directly back into data cache 10 when a write procedure is executed, i.e., when an IGR value is to be written into data cache 10 for the data post 12 currently under intervisibility calculation. As previously described, the post elevation value taken from cache 10 is applied, by way of register 384, as elevation input 260 to the second input of subtraction unit 258.

Calculation of an IGR value for the data post 12 currently under intervisibility calculation is made available at the output 388 of multiplier 250. Output 388 is then stored in calculated IGR register 390. A zero register 392 holds a zero constant. The content of current IGR register 382, calculated IGR register 390, and zero value register 392 are made available to the input of a magnitude compare block 394 and to a write register 396. As may be appreciated, magnitude compare block 394 can provide comparison between the current IGR value as taken from register 382 and originating from data cache 10 with the calculated IGR value as made available in calculated IGR register 390. Also, the current IGR and calculated IGR may be compared to a zero constant by reference to the zero register 392. Write register 396 gets either a zero value from register 392, a new or calculated IGR value from register 390, or the current IGR value as taken from register 382. Once the content of write register 396 is established for a given data post 12, a write procedure is applied to data cache 10 employing the current XY address value as taken from registers 220 and 222. The contents of write register 396, i.e., an IGR value, and the contents of register 386, i.e., a data post elevation value, are written to the data cache 10.

Magnitude compare block 394 asserts one of three conditions, i.e. an A=B condition 400, an A<B condition 402, and an A>B condition 404. Also, subtraction unit 258 provides a carry condition 406, a borrow condition 408, and a zero condition 410. The above described conditions, including EOL condition 242 as provided by radial distance accumulator 240, are applied as inputs to the micro code controller 380. In turn, micro code controller 380 provides a variety of control signals 412 applied to various control points of engine 200. For example, the control signals 412 might be applied to various ones of the described registers to cause such registers to assert or not assert contents on a data bus. In this manner, data made available to a given input may be applied to that input as orchestrated by micro code controller 380.

For example, the first input of multiplier 250 can receive either the step count value 244 as provided by register 252, or can receive its reciprocal as provided by table 256. Similarly, subtraction unit 258 has available at its first input a curvature corrected output 256 of table 254 and also has available the threat altitude input 208 as provided by threat altitude register 274. Micro code controller 280 responds to various conditions, e.g. conditions 242, 400, 402, 404, 406, 408 and 410 of the engine 200 and with appropriate micro code programming steps the engine 200 through the intervisibility calculation process by manipulating the available data in such manner to apply the appropriate input to the devices of engine 200 according to the particular micro code step in the intervisibility calculation.

The output 388 provided by multiplier 250 provides during intervisibility calculation the result of slope calculations. Accordingly, output 388 is made available to a new slope register 420 to store $S_{new}$. A reference slope register 422 holds the current reference slope $S_{ref}$, i.e. the slope of greatest magnitude encountered thus far in traversing the current radial 14. When the calculated new slope $S_{new}$, i.e. that associated with the data post 12 currently under intervisibility calculation, exceeds the reference slope, the contents of new slope register 420 are copied into reference slope register 422. Accordingly, the output of new slope register 420 is made available to the input of reference slope register 422. Also, the output of reference slope register 422 is made available to the first input of subtraction unit 258 and the output of new slope register 420 is made available to the second input of the subtraction unit 258.

As will be appreciated by those skilled in the art, the flow chart presented in FIG. 9 may be incorporated into the micro programming of micro code controller 380 to accomplish an intervisibility calculation cycle as set forth in the flow chart of FIG. 9 in accordance with the method of intervisibility calculation presented hereinabove.

Thus, a device for rapid execution of intervisibility calculations has been shown and described. The intervisibility engine shown herein calculates terrain masked threat intervisibility at real-time speeds. The information generated can be used to create a translucent display overlaid on a moving Digitized Aeronautical Chart or a DLMS Map Cockpit Display. The calculation can include such parameters as detection distance, earth curvature, radar beam curvature and variation in the portion of a 360 degree scan executed.

The resulting intervisibility calculations aid the pilot in avoiding radar detection by hostile air defenses. This is accomplished by indicating to the pilot the landmass areas that are naturally shielded from radar, i.e. terrain masked, due to positioning and the range limit of the radar based installation. The pilot can then fly a route at a given above ground level set clearance utilizing these terrain masked areas as primary route selections. By providing the intervisibility calculation in real-time, the effect of a threat placement change or radar coverage change can quickly be displayed to the pilot. This allows the pilot to take immediate evasive actions as necessary to avoid a newly detected or recently moved threat.

By implementing intervisibility calculations in a dedicated, simple engine, other processing devices, e.g. a higher level processing component, are free to execute or manage multiple processes. Under the implementation of the present invention, intervisibility calculations are simply off loaded to the intervisibility engine of the present invention which directly modifies an associated data cache. The implementation shown provides high calculation speed, versatility in threat parameter programmability, a short development schedule, and reasonable cost constraints. Generally, the illustrated implementation can be implemented by use of basic components to perform the core calculations and, where available for use, application specific integrated circuits (ASIC) developed for specific uses, e.g., an addressing mechanism which may be applied to a large digital elevation data cache with rapid response time. By using precalculated data in lookup tables execution time and computational hardware resources are minimized. Mathematical requirements of the hardware are limited to simple and fast, adds, subtracts, and multiplies. Overall, the implementation provides the important function of dynamic in flight intervisibility calculations in a rapid and accurate manner. Such data may be used by a pilot to successfully complete a given covert mission.

This invention has been described herein in considerable detail in order to comply with the Patent Statutes and to provide those skilled in the art with the information needed to apply the novel principles and to construct and use such specialized components as are required. However, it is to be understood that the invention is not restricted to the particular embodiment that has been described and illustrated, but can be carried out by specifically different equipment and devices, and that various modifications, both as to the equipment details and operating procedures, can be accomplished without departing from the scope of the invention itself.

What is claimed is:

The embodiments of the invention in which an exclusive property or right is claimed are defined as follows:

1. An apparatus for intervisibility determination comprising:

a data memory for storing digital terrain elevation data, said digital terrain elevation data is comprised of a plurality of data posts which contain latitude, longitude, and altitude of actual geographic points in a designated area, each data post being addressable within said memory;

input parameter registers for receiving parameter values including a threat position and a threat range capability;

a memory addressing element for receiving said threat position from one of said parameter registers and selecting for visitation a series of data posts along a radial emanating from said threat position to a distance corresponding to said threat range capability;

a step counting element for tallying the number of data posts visited along said radial as a step count;

means for generating a slope for each data post visited comprising:
  a subtraction unit which outputs a signal proportional to the difference between the data post elevation and a stored value of the threat altitude;
  a reciprocal lookup table which outputs a signal with a magnitude proportional to the reciprocal of the threat distance; and
  a multiplier which multiplies the subtraction unit with the reciprocal lookup table signal to generate a slope;

a slope storage element for maintaining the greatest magnitude slope calculated for each data post visited along said radial; and means for generating an intervisibility determination as a function of the relative magnitude of the slope and the greatest magnitude slope maintained.

2. An apparatus according to claim 1 wherein the subtraction unit receives correction signal for earth and radar curvature.

3. The apparatus of claim 2 wherein the intervisibility determination is perfromed by a magnitude comparator which compares the current slope with the highest previously measured slope.

4. The apparatus of claim 3 wherein the apparatus includes a microcontroller which provides a plurality of control signals to direct the intervisiblity calculation.

* * * * *